United States Patent [19]

Miyamoto et al.

[11] 4,412,008

[45] Oct. 25, 1983

[54] COMPOSITE SINTER OF SILICON NITRIDE/BORON NITRIDE AND METHOD FOR MANUFACTURING THEREOF

[75] Inventors: Akira Miyamoto, Tokyo; Masaru Ishikawa; Masaaki Nishi, both of Fukuyama; Kenki Ishizawa; Akira Shiranita, both of Bizen, all of Japan

[73] Assignees: Nippon Kokan Kabushiki Kaisha; Shinagawa Shiroenga Kabushiki Kaisha, both of Tokyo, Japan

[21] Appl. No.: 234,939

[22] Filed: Feb. 11, 1981

[30] Foreign Application Priority Data

Feb. 23, 1980 [JP] Japan ................................ 55-21070

[51] Int. Cl.$^3$ .............................................. C04B 35/58
[52] U.S. Cl. .................................................. 501/97
[58] Field of Search .............................. 501/96–98, 501/154

[56] References Cited

U.S. PATENT DOCUMENTS

| 2,839,413 | 12/1979 | Buljan ................................. 501/97 |
| 4,017,319 | 4/1977 | Greskovich et al. ................. 501/97 |

FOREIGN PATENT DOCUMENTS

| 189555 | 5/1952 | Austria ............................... 501/97 |
| 2152066 | 4/1972 | Fed. Rep. of Germany ........ 501/97 |
| 2356921 | 3/1974 | Fed. Rep. of Germany ........ 501/97 |
| 2458691 | 7/1975 | Fed. Rep. of Germany ........ 501/97 |
| 2855785 | 7/1979 | Fed. Rep. of Germany ........ 501/97 |
| 1581294 | 9/1969 | France ................................. 501/97 |
| 1587349 | 3/1970 | France ................................. 501/97 |
| 2111595 | 2/1972 | France ................................. 501/97 |
| 2412509 | 7/1979 | France ................................. 501/97 |
| 46-10671 | 1/1971 | Japan ................................... 501/97 |
| 1376891 | 12/1974 | United Kingdom ................. 501/97 |
| 1393579 | 5/1975 | United Kingdom ................. 501/97 |

OTHER PUBLICATIONS

Chem. Abstracts, vol. 91, No. 22, p. 307.

Primary Examiner—James Poer
Attorney, Agent, or Firm—Frishauf, Holtz, Goodman & Woodward

[57] ABSTRACT

A composite sinter of silicon nitride/boron nitride, which consists essentially of, in weight percentage, silicon nitride within the range of from 60 to 97% and boron nitride within the range of from 3 to 40%, and wherein said boron nitride is present as a dispersed phase in the network of said silicon nitride; said composite sinter of silicon nitride/boron nitride being manufactured by the steps of: kneading a silicon powder within the range of from 47.3 to 95.1 wt.% and a boron nitride powder within the range of from 4.9 to 52.7 wt.%, as raw materials, with the use of an organic solvent solution containing a dispersant and a binder; press-forming the resultant kneaded mixture to prepare a green compact; sintering said green compact in a non-oxidizing atmosphere at a temperature within the range of from 1,100° to 1,300° C. to prepare a sinter having a strength permitting machining; machining said sinter into prescribed dimensions; and sintering again the resultant machined sinter in a nitrogen atmosphere at a temperature within the range of from 1,250° to 1,450° C. to nitrify the same, thereby improving strength and thermal shock resistance of said sinter.

10 Claims, 9 Drawing Figures

COMPOSITE SINTER OF SILICON NITRIDE/BORON NITRIDE AND METHOD FOR MANUFACTURING THEREOF

REFERENCE TO PATENTS, APPLICATIONS AND PUBLICATIONS PERTINENT TO THE INVENTION

As far as we know, there is available the following prior document pertinent to the present invention:

(1) Japanese Patent Provisional Publication No. 7/71 dated July 16 1971 (Japanese Patent Application No. 106/71 dated Jan. 7, 1971) corresponding to British Patent Application No. 798/70 dated Jan. 7, 1970.

The content of the prior art disclosed in the above-mentioned prior document will be described hereafter under the heading of the "BACKGROUND OF THE INVENTION".

FIELD OF THE INVENTION

The present invention relates to a composite sinter of silicon nitride-boron nitride and a method for manufacturing thereof, which composite sinter has a high thermal shock resistance even under severe service conditions and is excellent in wear resistance and erosion resistance.

BACKGROUND OF THE INVENTION

In place of the vertical type continuous casting process which comprises casting steel by vertically withdrawing a cast strand from a vertical mold installed below a tundish, the horizontal type continuous casting process which comprises casting steel by horizontally withdrawing a cast strand from a horizontal mold installed at the lower part of the side wall of a tundish is recently being industrialized because of the low installation costs and other advantages.

Figure 1:
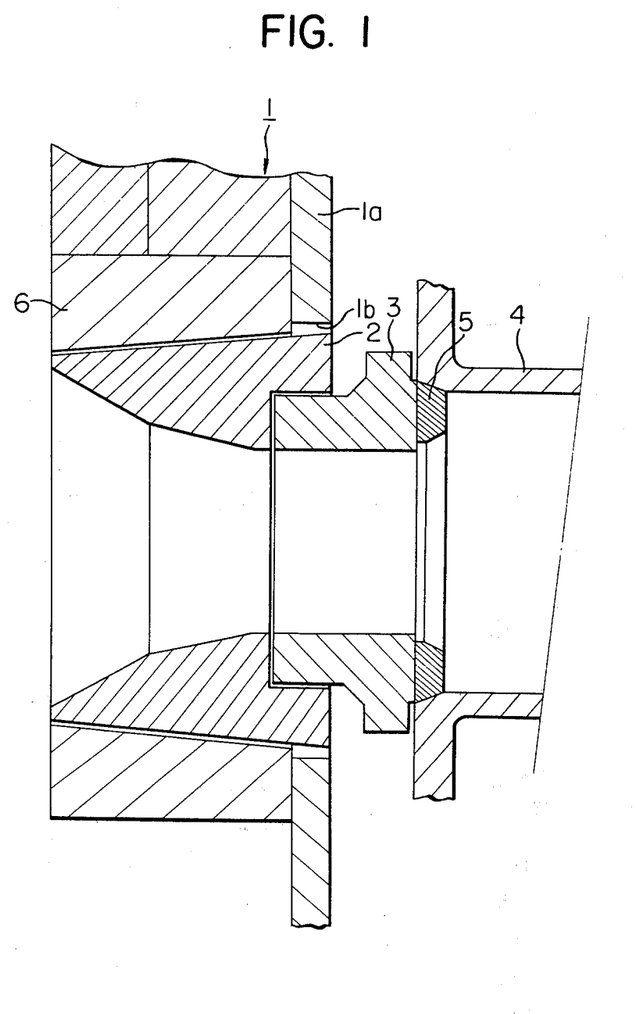
FIG. 1 is a sectional view illustrating an embodiment for fitting a break ring to a mold in a horizontal type continuous casting apparatus.

The construction of the junction between the tundish and the horizontal mold in a horizontal type condinuous casting machine used in the above-mentioned horizontal type continuous casting process is illustrated in the form of a schematic sectional view in FIG. 1. In FIG. 1, 1 is a tundish; 1a is a steel shell of the tundish 1; 1b is a molten steel outlet pierced through the steel shell 1a, to which fitted is a seating ring 6 to which fitted inside is a horizontal front nozzle 2 having a recess for engaging with a feed nozzle. Also in FIGS. 1, 3 is a feed nozzle horizontally connected to the top of the front nozzle 2, and a break ring 5 is fitted to the top of the feed nozzle 3; and 4 is a water-cooled type mold, connected horizontally, through the break ring 5, to the top of the feed nozzle 3. Molten steel contained in the tundish 1 is poured through the front nozzle 2, the feed nozzle 3, and the break ring 5, into the mold 4 to be cast into a cast strand, which is then horizontally withdrawn from the mold 4.

In the above-mentioned horizontal type continuous casting machine, the side of the break ring 5 in contact with molten steel is heated to a high temperature, whereas the side in contact with the water-cooled mold 4 remains at a low temperature. In the break ring 5 under such severe conditions, cracks and breakage may easily occur.

Therefore, a break ring should have properties satisfying the following conditions:

(1) to be excellent in wear resistance and erosion resistance;
(2) to be excellent in thermal shock resistance;
(3) to be excellent in resistance against thermal stress caused by a sharp temperature gradient;
(4) to have the portion, in contact with the mold, made of a material capable of being shaped at a high precision, since this portion is required to have a high degree of sealing so as to prevent molten steel from coming in; and,
(5) to be excellent in partibility of the initial solidification shell formed on the molten steel surface in the mold.

The generally known materials for a break ring include alumina, zirconia, molten silica, silicon nitride, boron nitride and zirconia/molybdenum cermet. A break ring made of alumina or zirconia, from among the above-mentioned materials, has a low thermal stress resistance and tends easily to produce cracks. A break ring made of molten silica has its portion, which is in contact with molten steel, melting vitreously. Therefore, a break ring made of any one of alumina, zirconia and molten silica cannot satisfy the above-mentioned conditions. On the other hand, a break ring made of any one of silicon nitride, boron nitride and zirconia/molybdenum cermet is believed to almost satisfy the above-mentioned conditions. Particularly, a break ring made of silicon nitride is considered to be optimum because of its relatively low cost.

The break ring made of silicon nitride is manufactured by machining a silicon nitride sinter. For manufacturing a silicon nitride sinter, the following methods are generally known:

(1) Reaction sintering method

Press-forming a silicon powder added with a binder to prepare a green compact; sintering the resultant green compact to prepare a sinter having a strength permitting machining; machining this sinter into prescribed dimensions; and then, sintering again the machined sinter in a nitrogen atmosphere to nitrify the same.

(2) Hot-press method

Sintering a silicon nitride powder added with a binder and a sintering assistant while applying a pressure to prepare a sinter; and, machining the resultant sinter in prescribed dimensions.

(3) Normal-pressure sintering method

Press-forming a silicon nitride powder added with a binder and a sintering assistant to prepare a green compact; sintering the resultant green compact under a normal pressure, i.e., an atmospheric pressure to prepare a sinter; and, machining the resultant sinter into prescribed dimensions.

From among the above-mentioned methods for manufacturing a silicon nitride sinter, in the hot-press method and the normal-pressure sintering method, it is difficult to apply machining in shaping a sinter because of the very high strength of the sinter, and therefore, the shaping cost is so high as about 30 times that of a sinter manufactured by the reaction sintering method. In the case where it is necessary to shape the sinter at a high precision, therefore, manufacture by the reaction sintering method is advantageous in ecomonical point.

As a horizontal type continuous casting apparatus using a break ring made of the above-mentioned silicon nitride sinter, the following apparatus has been proposed:

A continuous casting apparatus, disclosed in Japanese Patent Provisional Publication No. 7/71 dated July 16, 1871 (Japanese Patent Application No. 106/71 dated Jan. 7, 1971) corresponding to British Patent Application No. 798/70 dated Jan. 7, 1970, which comprises:

a tundish, having an outlet made of a refractory, for containing a molten metal; a mold having a molding passage communicating with said outlet of said tundish; an annular silicon nitride sinter having a bore smaller in sectional area than said molding passage, arranged in close contact between said mold and said tundish, for passing said molten metal; and a metal member arranged along and pressed against the peripheral edge of said silicon nitride sinter, and in contact with said mold so as to permit thermal conduction.

However, the conventional horizontal type continuous casting machine using a break ring made of the above-mentioned silicon nitride sinter is to cast a small-diameter cast strand having a diameter of about 50 mm, for example, under such casting conditions as a maximum length of the cast strand of 110 m, a maximum casting time of 55 minutes, and a withdrawal speed of the cast strand of frm 0.7 to 3.5 m/min, and not to cast a large-sized cast strand.

We carried out a casting test of large-sized cast strand under the casting conditions shown in Table 1 below, with the use of a break ring made of the above-mentioned silicon nitride sinter.

TABLE 1

| Tundish capacity | 1 ton of molten steel |
| --- | --- |
| Mold shape | 115 mm (distance across flats) square (made of copper, water-cooled type) |
| Casting speed | from 1.0 to 2.5 m/min |
| Molten steel temperature in tundish | 1,520 to 1,570° C. |

As a result of the casting test of large-sized cast strand, damage occurred in the break ring, and it was impossible to continuously cast the cast strands for a long period of time. We therefore investigated the form of the damage which occurred in the break ring, and tried various improvements of the materials for the break ring with reference to the results of investigation. The major improvements are as follows:

(1) changing the ratio of α-type to β-type crystal forms of silicon nitride;
(2) increasing the degree of nitrification;
(3) increasing the purity of the silicon powder serving as the raw material to improve the purity of the product;
(4) increasing the bulk density of the silicon powder serving as the raw material to increase the density of the product;
(5) applying a pitch-impregnation treatment to the product; and,
(6) subjecting the product to a heat treatment.

Table 2 shows the chemical composition and major properties of a break ring made of the conventional material and break rings applied with the above-mentioned improvements.

TABLE 2

| | | | Chemical composition | | | Properties | | | | |
| --- | --- | --- | --- | --- | --- | --- | --- | --- | --- | --- |
| | | | Main constituent (wt. %) | | α/β ratio of $Si_3N_4$ (wt. %) | | Physical properties | | | Strength |
| | | | | | | | | | | Compressive | Bending |
| | | | $Si_3N_4$ | $SiO_2$ | α-$Si_3N_4$ | β-$Si_3N_4$ | Apparent porosity (%) | Bulk density | Apparent density | strength (kg/cm$^2$) | strength (kg/cm$^2$) |
| Conventional break ring | | | 95.06 | 2.70 | 45 | 55 | 23.6 | 2.39 | 3.13 | 4,500 | 1,600 |
| Break ring applied with improvements | 1 | α-$Si_3N_4$ type | 95.89 | 2.53 | 62 | 38 | 18.5 | 2.54 | 3.13 | 5,050 | 1.896 |
| | 2 | β-$Si_3N_{1.896}$ type | 95.41 | 2.98 | 15 | 85 | 18.6 | 2.55 | 3.14 | 5,100 | 1,680 |
| | 3 | High purity type | 97.10 | 2.00 | 57 | 43 | 21.5 | 2.48 | 3.16 | 4,300 | 1,500 |
| | 4 | High density type | 96.40 | 2.40 | 60 | 40 | 15.3 | 2.64 | 3.13 | 5,400 | 2,150 |
| | 5 | Pitch-impregnated type | 90.10 | 2.10 | 62 | 38 | 3.8 | 2.69 | 2.80 | 5,000 | 1,870 |
| | 6 | Heat-treated type | 95.30 | 2.60 | 65 | 35 | 19.1 | 2.54 | 3.14 | 5,000 | 1,850 |

Figure 2:
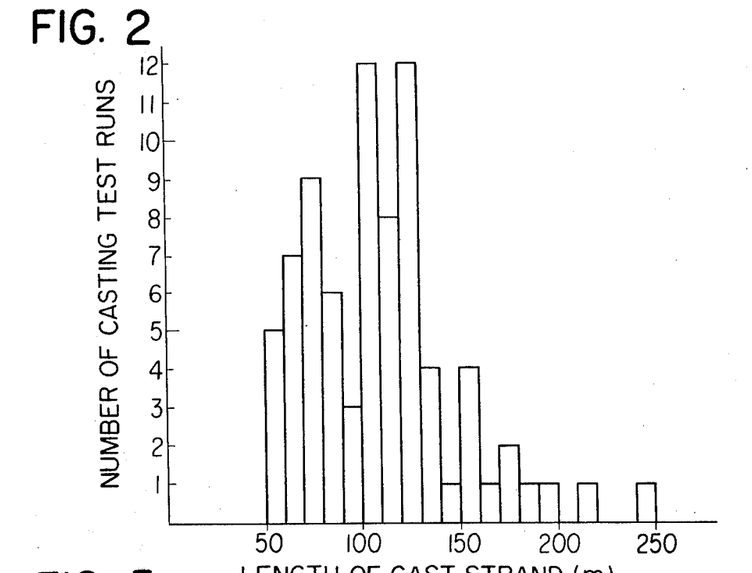
FIG. 2 is a graph illustrating the cast strand length in a horizontal type continuous casting test carried out with the conventional break ring.

FIG. 2 is a graph illustrating the length of the cast strands cast in a horizontal continuous casting test carried out with the use of the conventional break ring having the chemical composition and the properties as shown in Table 2 given above and the break rings applied with the improvements. In FIG. 2, the abscissa indicates the cast length of a cast strand in a single casting run, and the ordinate indicates the number of casting runs for each of said cast strands. In total, 97 casting test runs were carried out, out of which a cast strand length of over 160 m was obtained in only seven runs, and most of the cast strands had a length of only about 100 m. This is attributable to the fact that the break ring was damaged during casting, leading to a breakout, and it became impossible to continue casting.

We investigated the causes of the above-mentioned damages to the break rings, and as a result determined that spalling occurring on the contact portion of the break ring with molten steel was the main cause of the damages to the break rings. This spalling is caused by the fact that cracks of from 0.5 to 5.0 mm in depth occur on the contact surface of the break ring with molten steel, and the surface layers of cracked portions partially exfoliate. Said spalling produces a sharp recess on the contact surface of the break ring with molten steel. As a result, when withdrawing the cast strand from the mold, the initial solidification shell formed on the molten steel surface in the mold eats into said recess, thus damaging the break ring. Said initial solidification shell is also broken, thus causing a breakout.

Fine spallings occur also at corners of the break ring in contact with the mold. A large temperature gradient of the corners of the break ring causes a large thermal stress, which in turn causes cracks leading to these spallings. These spallings taking place at the corners of the break ring in contact with the mold would cause the inflow of molten steel into the space between the mold and the break ring, which inflow in turn causes flaws and breakout of the cast strand, leading to the impossibility of casting.

Erosion caused by the contact between the break ring and molten steel generally takes such form as a flat erosion over the entire contact surface with molten steel, or a shallow and smooth groove-like erosion and does not form a sharp recess-like erosion which would lead to a stress fracture. We found therefore that said erosion causes a breakout only in limited cases.

We analyzed the break rings, on which spalling occured, for thermal stress. According to the results of this analysis, a thermal stress far exceeding the critical strength is produced in said break rings, and occurrence of said spalling is inevitable. This spalling cannot be avoided even by applying any of the above-mentioned improvements to the silicon nitride sinter serving as the raw material for the break ring. With a break ring made of a silicon nitride sinter, therefore, it is impossible to continuously cast in a stable manner a large-sized cast strand to a length of more than 200 m, which is practically required.

SUMMARY OF THE INVENTION

Objects of the present invention are therefore to provide a composite sinter of silicon nitride/boron nitride and a method for manufacturing thereof, which sinter is high in thermal shock resistance even under severe service conditions and is excellent in wear resistance and erosion resistance.

Other objects of the present invention are to provide a composite sinter of silicon nitride/boron nitride and a method for manufacturing thereof, from which composite sinter a member requiring a high precision shape can easily be manufactured by machining.

In accordance with one of the features of the present invention, there is provided a composite sinter of silicon nitride/boron nitride, which consists essentially of, in weight percentage, silicon nitride within the range of from 60 to 97% and boron nitride within the range of from 3 to 40%, and wherein said boron nitride is present as a dispersed phase in the network of said silicon nitride.

In accordance with another feature of the present invention, there is provided a method for manufacturing a composite sinter of silicon nitride/boron nitride, which comprises:

Kneading a silicon powder within the range of from 47.3 to 95.1 wt.% and a boron nitride within the range of from 4.9 to 52.7 wt.%, as raw materials, with the use of an organic solvent solution containing a dispersant and a binder;

press-forming the resultant kneaded mixture to prepare a green compact;

sintering said green compact in a non-oxidizing atmosphere at a temperature within the range of from 1,100° to 1,300° C. to prepare a sinter having a strength permitting machining;

machining said sinter into prescribed dimensions; and, sintering again the resultant machined sinter in a nitrogen atmosphere at a temperature within the range of from 1,250° to 1,450° C. to nitrify the same, thereby improving strength and thermal shock resistance of said sinter.

DETAILED DESCRIPTION OF PREFERRED EMBODIMENTS

From the above-mentioned point of view, we carried out various tests and studies with a view to developing a composite sinter and a method for manufacturing thereof, which composite sinter has a high thermal shock resistance even under such severe service conditions as in a break ring for horizontal type continuous casting, and excellent in wear resistance and erosion resistance.

In order to improve the thermal shock resistance, it is necessary to make studies from the aspect of both resistance to the occurrence of cracks (hereinafter referred to as "cracking resistance") and resistance to propagation and expansion of once initiated cracks (hereinafter referred to as "crack propagation resistance") of the material in question. In general, if a material having a certain quality has a sufficient cracking resistance under certain conditions, the material has a high thermal shock resistance. However, when cracking resistance of that material is too low under certain other conditions so that it is impossible to prevent occurrence of cracks, thermal shock resistance cannot be increased unless crack propagation resistance is improved to prevent once occurring cracks from propagating.

The extent of cracking resistance is dependent upon the essential physical properties of the material, and is largely affected also by surface defects or inner defects such as flaws occurring on the material. More specifically, a stress concentration of from several hundred times to several thousand times as large as the external force acting on the material occurs at tip portions of flaws occurred in the material, and cracks tend to be initiated from said flaws. A material easily susceptible to elastic failure such as a ceramic has a strength far lower than the theoretical strength thereof because of the occurrence of defects as described above.

In a break ring for horizontal type continuous casting, for example, occurrence of surface or inner defects such as flaws is inevitable because of the severe service conditions. It is therefore difficult to improve cracking resistance thereof. We thus noted to improve crack propagation resistance.

We first investigated bending strength, modulus of elasticity, cracking resistance and crack propagation resistance of silicon nitride sinter and boron nitride sinter. From among several ways available for expressing cracking resistance and crack propagation resistance, the following formulae are employed here:

(1) Cracking resistance (Rf)

$$Rf = S_{MOR}/E$$

(2) Crack propagation resistance (Rd)

$$Rd = 2E/S^2_{MOR}$$

where,
$S_{MOR}$: bending strength,
E: modulus of elasticity.

Table 3 shows values of bending strength, modulus of elasticity, cracking resistance and crack propagation resistance for a silicon nitride sinter manufactured by the hot press method, a silicon nitride sinter manufactured by the reaction sintering method, and a boron nitride sinter manufactured by the hot press method. In Table 3, cracking resistance is the elastic strain near the leading end of a crack at the moment of crack initiation, and a larger value expresses a harder initiation of a crack. Crack propagation resistance is the reciprocal of the elastic energy per unit volume accumulated before initiation of a crack at the moment of crack initiation, and a larger value indicates a harder propagation of a crack. In Table 3, the boron nitride sinter was manufactured, with a hexagonal boron nitride powder as the raw material, by the hot press method, and has crystal structure and properties similar to those of graphite. Because of its directivity, properties were investigated on a sinter in the same direction of the forming direction and another sinter in a direction at right angles to the forming direction.

(1) The silicon nitride sinter manufactured by the hot-press method is a high-strength material showing a bending strength almost equal to the theoretical strength. The high cracking resistance makes it difficult for a crack to occur, whereas, because of the low crack propagation resistance, a once occurring crack tends to propagate at a time.

(2) The silicon nitride sinter manufactured by the reaction sintering method is lower both in bending strength and cracking resistance as compared with the silicon nitride sinter manufactured by the hot-press method, but is superior in crack propagation resistance to the silicon nitride sinter manufactured by the hot-press method. However, this superiority in crack propagation resistance is rather limited.

(3) The boron nitride sinter is lower in bending strength as compared with the silicon nitride sinter and has a directivity, but is remarkably higher in crack propagation resistance in any direction than the silicon nitride sinter, resulting in a property leading to harder propagation of crack.

We learned, from the above-mentioned properties of sinters, that, by blending boron nitride excellent in crack propagation resistance, as a dispersed phase, into a silicon nitride sinter manufactured by the reaction sintering method, it was possible to improve thermal shock resistance of the resultant composite sinter as a whole.

The present invention was made on the basis of the above-mentioned finding, and a composite sinter of silicon nitride/boron nitride of the present invention consists essentially of:

silicon nitride within the range of, in weight percentage, from 60 to 97% and boron nitride within the range of from 3 to 40%, and wherein said boron nitride is present as a dispersed phase in the network of said silicon nitride; and said composite sinter of silicon nitride/boron nitride of the present invention being manufactured by the steps of:

kneading a silicon powder within the range of from 47.3 to 95.1 wt. % and boron nitride within the range of from 4.9 to 52.7 wt. %, as the raw materials, with the use of an organic solvent containing a dispersant and a binder;

press-forming the resultant kneaded mixture to prepare a green compact;

TABLE 3

| Mechanical properties | | Silicon nitride sinter | | Boron nitride sinter made by hot-press method | |
|---|---|---|---|---|---|
| | | Made by hot-press method | Made by reaction sintering method | In parallel with forming direction | At right angle to forming direction |
| Bending strength $S_{MOR}$ (kg/cm²) | Room temp. | 7,000 | 2,150 | 1,200 | 525 |
| | 1000–1200° C. | 4,900 | — | 175 | 70 |
| Modulus of elasticity E (kg/cm²) | Room temp. | $5.6 \times 10^5$ | $20 \times 10^5$ | $9.1 \times 10^5$ | $3.5 \times 10^5$ |
| | 1000–1200° C. | $21.7 \times 10^5$ | — | $0.7 \times 10^5$ | $0.7 \times 10^5$ |
| Cracking resistance $S_{MOR}/E$ | Room temp. | $12,500 \times 10^{-6}$ | $1,075 \times 10^{-6}$ | $1,319 \times 10^{-6}$ | $1,500 \times 10^{-6}$ |
| | 1000–1200° C. | $2,258 \times 10^{-6}$ | — | $2,500 \times 10^{-6}$ | $1,000 \times 10^{-6}$ |
| Crack propagation resistance $2E/S_{MOR}^2$ | Room Temp. | 0.0228 | 0.865 | 1.264 | 2.540 |
| | 1000–1200° C. | 0.181 | — | 4.571 | 28.571 |

The following properties were derived from Table 3:

sintering said green compact in a non-oxidizing atmosphere at a temperature within the range of from 1,100° to 1,300° C. to prepare a sinter having a strength permitting machining;

machining said sinter into prescribed dimensions; and, sintering again the resultant machined sinter in a nitrogen atmosphere at a temperature within the range of from 1,250° to 1,450° C. to nitrify the same, thereby improving strength and thermal shock resistance of said sinter.

Now, the reasons why the chemical composition of the composite sinter of silicon nitride/boron nitride of the present invention is limited as mentioned above are described.

(A) Content of silicon nitride

Silicon nitride is an indispensable constituent for forming a network in the sintered structure and imparting to the sinter excellent characteristics in wear resistance, erosion resistance, thermal shock resistance and strength.

However, with a content of silicon nitride of under 60 wt. %, it is impossible to form a network of silicon nitride in the sintered structure and hence impossible to obtain the necessary strength. In addition, such a low content of silicon nitride leads to a decrease of bulk density, and as a result, it is impossible to smoothly conduct kneading and blending of raw materials in the manufacturing process. The content of silicon nitride should therefore be at least 60 wt. %. With a content of silicon nitride of over 97 wt. %, on the other hand, the content of boron nitride as described later relatively decreases, thus making it impossible to improve crack propagation resistance. The content of silicon nitride should therefore be up to 97 wt. %.

(B) Content of boron nitride

Boron nitride is present as a dispersed phase in the sintered structure, and has the effects of imparting to the sinter an excellent crack propagation resistance and improving thermal shock resistance.

However, with a content of boron nitride of under 3 wt. %, the desired effects as mentioned above cannot be obtained. The content of boron nitride should therefore be at least 3 wt. %. With a content of boron nitride of over 40 wt. %, on the other hand, the content of silicon nitride relatively decreases, thus making it impossible to form a network of silicon nitride in the sintered structure, and reducing the strength of the sinter. The content of boron nitride should therefore be up to 40 wt. %.

Now, the method for manufacturing the composite sinter of silicon nitride/boron nitride of the present invention is described in detail.

A silicon powder having a particle size of up to 74 μm and a boron nitride powder having a particle size of up to 500 μm are employed as raw materials. Each of the silicon powder and the boron nitride powder should have a purity of at least 97%. Particularly, it is desirable to use a boron nitride powder with a high purity of at least 99%, since if boron oxide ($B_2O_3$), which is one of impurities, is present in the boron nitride powder, the boron oxide ($B_2O_3$) melting vitreously at the time of sintering covers the periphery of the sinter, impairs permeability, and thus makes nitrification difficult.

Said silicon powder is blended in an amount within the range of, in weight percentage, from 47.3 to 95.1%, and said boron nitride powder is blended in an amount within the range of from 4.9 to 52.7 wt. %. The amounts of blend of the silicon powder and the boron nitride powder should be within the above-mentioned ranges respectively, and thus it is possible to obtain a composite sinter of silicon nitride/boron nitride, which consists essentially of, in weight percentage, from 60 to 97% silicon nitride and from 3 to 40% boron nitride.

Said raw materials are mixed. Then, a non-oxidizing organic solvent solution such as ethanol, butanol or hexane containing a dispersant and a binder is added to the mixed raw materials in a ratio of from 20 to 30 wt. % of said raw materials, and the resultant mixture is sufficiently kneaded.

Blending and kneading of raw materials are possible, in addition to the above-mentioned method, also by the following method: an organic solvent solution containing a dispersant and a binder is added to a boron nitride powder within the range of from 4.9 to 52.7 wt. %, and the resultant mixture is kneaded. Silicon powder within the range of from 47.3 to 95.1 wt. % is added to the kneaded mixture, and the resultant new mixture is kneaded sufficiently.

Thus obtained kneaded mixture is granulated into particles each having a prescribed particle size. These particles are dried to cause evaporation of the binder contained in these particles and remove the binder, and the resultant particles are charged into a mold to subject to press-forming by a press equipment, preferably by a rubber press machine, and thus to prepare a green compact.

Then, said green compact is sintered, in a non-oxidizing atmosphere such as argon (Ar) or nitrogen ($N_2$), at a temperature of from 1,100° to 1,300° C., to prepare a sinter having a strength sufficient to permit machining. The sintering temperature of the green compact should be a temperature of from 1,100° to 1,300° C. With a temperature of under 1,100° C., it is impossible to impart to the resultant sinter a strength sufficient to permit machining, whereas with a temperature of over 1,300° C., the strength of the sinter is too high so that application of machining is difficult. More preferably, the desirable sintering temperature is within the range of from 1,100° to 1,200° C.

Then, said sinter is machined to prescribed dimensions. The resultant machined sinter is sintered again in a nitrogen atmosphere at a temperature of from 1,250° to 1,450° C. to nitrify said sinter, whereby a composite sinter of silicon nitride/boron nitride excellent in thermal shock resistance and strength is obtained. The re-sintering temperature of the sinter should be a temperature within the range of from 1,250 to 1,450° C. By sintering again the machined sinter at a temperature within this range, the sinter is nitrified and obtains excellent characteristics in thermal shock resistance and strength. In sintering, the machined sinter is first heated to a temperature of about 1,250° C., which temperature is lower than the melting point of silicon, to form a shell of silicon nitride on the surfaces of silicon particles. Then, the temperature is gradually increased up to a temperature within the range of from 1,400° to 1,450° C. at the maximum, and then, it is desirable to hold the maximum temperature for a certain period of time. By doing this, it is possible, in sintering, to inhibit the seepage of the liquid-phase silicon appearing in the silicon particles with the presence of the shell formed on the surfaces of the silicon particles. Thus, the permeability of the sinter is not impaired by the seepage of the liquid-phase silicon.

When, in manufacturing a composite sinter of silicon nitride/boron nitride by the above-mentioned method, a sinter having a large thickness is required, permeability may become insufficient during sintering, leading to a decrease in strength. In this case, therefore, it is desirable to add silicon nitride powder, as an additional raw material, in a ratio of up to 40 wt. % of the total amount including the silicon nitride powder and the silicon powder. The amount of added silicon nitride powder should be up to 40 wt. % of the total amount including the silicon nitride powder and the silicon powder, because, with an amount of over 40 wt. %, sintering property is deteriorated, and this results in the decrease of the strength of the sinter.

By adding to said raw materials, or to said raw materials and said additional raw material, at least one of magnesia (MgO), yttria ($Y_2O_3$), alumina ($Al_2O_3$), and lanthanium oxide ($La_2O_3$), as the sintering assistant, in an amount within the range of up to 10 wt. % of the total amount with said raw materials, or said raw materials and said additional raw material, it is possible to accelerate sintering, and thus to improve the strength of the sinter. The amount of added sintering assistant should be up to 10 wt. % of the total amount with said raw materials, or said raw materials and said additional raw material, because, with an amount of over 10 wt. %, it becomes impossible, due to this high weight percentage of the sintering assistant to obtain a composite sinter of silicon nitride/boron nitride in which boron nitride is present as a dispersed phase in the network of silicon nitride.

Now, the composite sinter of silicon nitride/boron nitride and the method for manufacturing thereof of the present invention are described in more detail with reference to examples.

EXAMPLE 1

A silicon powder of a purity of over 97% consisting of 25 wt. % particles each having particle size of from 74 μm to 44 μm and 75 wt. % particles each having particle size of up to 43 μm, and a boron nitride powder of a purity of 99% of which particle size is up to 10 μm were employed as raw materials. The above-mentioned silicon powder was first sufficiently mixed for about 30 minutes by using a V-type mixer. On the other hand, an organiz solvent solution being alcohol solution containing 0.2 wt. % oleic acid as a dispersant, and from 0.5 to 1.0 wt. % hydrocarbonaceous polymer as an organic binder, was prepared. This organic solvent solution was added to said boron nitride powder and the resultant mixture was uniformly mixed by using a ball mill for about 30 minutes.

Then, the mixture of the boron nitride powder and the organic solvent solution was added to said silicon powder, and the resultant new mixture was uniformly kneaded by using a ball mill for about 30 minutes. The kneaded mixture was granulated by using a granulator into particles of a prescribed particle size, and the resultant particles were dried at a temperature of up to 200° C., to evaporate and remove the binder contained in the particles. The particles of which the binder was thus removed were charged into a mold, and a pressure of about 1.5 tons/cm² was applied thereto by means of a rubber press machine to prepare a green compact.

This green compact was then placed in a sintering furnace, and was sintered in an argon gas atmosphere at a temperature of 1,200° C. for five hours, to prepare a sinter having a strength sufficient to permit machining. This sinter was machined into dimensions of 25 mm × 25 mm × 140 mm. The sinter machined into the above dimensions was then placed in the sintering furnace, and heated in a nitrogen atmosphere to keep the constant temperature of 1,250° C. for a period of time. After gradually increasing the temperature from 1,250° C. up to 1,450° C., the sinter was kept at the constant temperature of 1,450° for a period of time, sintered, nitrified and then slowly cooled from 1,450° C. to the room temperature. The period of time required for sintering and slow cooling included: 48 hours for the amount of a constant temperature keeping time at 1,250° C. and a temperature-raising time from 1,250° to 1,450° C.; 12 hours for keeping the constant temperature of 1,450° C.; and 48 hours for slow cooling from 1,450° C. to the room temperature. Thus, a composite sinter of silicon nitride/boron nitride having dimensions of 25 mm × 25 mm × 140 mm was obtained.

The above-mentioned composite sinter of silicon nitride/boron nitride was prepared, as shown in Table 4 below, into seven kinds of test specimens with different content ratios of silicon nitride to boron nitride, and with another test specimen, for comparison purposes, being a conventional sinter of silicon nitride not containing boron nitride, there were prepared eight kinds of test specimens in total.

TABLE 4

| Specimen No. | Silicon nitride (wt. %) | Boron nitride (wt. %) |
| --- | --- | --- |
| 1 | 100 | 0 |
| 2 | 95 | 5 |
| 3 | 90 | 10 |
| 4 | 85 | 15 |
| 5 | 80 | 20 |
| 6 | 70 | 30 |
| 7 | 60 | 40 |
| 8 | 50 | 50 |

Figure 3:
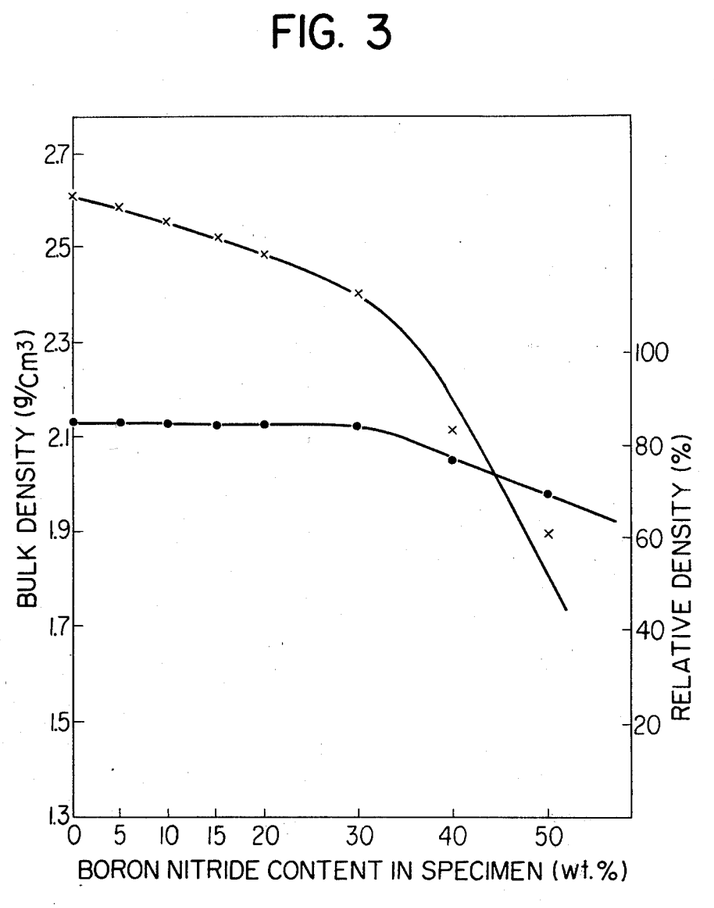
FIG. 3 is a graph illustrating the bulk density, and the relative density between the above bulk density and the theoretical density for various test specimens.

A test was carried out on the above-mentioned eight kinds of test specimens, for their characteristics in density, compressive strength, bending strength and thermal shock resistance. FIG. 3 is a graph illustrating values of the bulk density, and the relative density between the above bulk density and the theoretical density of test specimens. In FIG. 3, marks "X" represent the bulk density, and marks "●" represent the relative density. According as the content of boron nitride increases, the bulk density of specimen tends to decrease: for the specimen with a boron nitride content of 30 wt. %, the relative density could be kept at about 82%; and for the specimen with a boron nitride content of 40 wt. %, the relative density could be kept at about 77%. However, for the specimen with a boron nitride content of 50 wt. %, the relative density decreased to below 70%.

Figure 4:
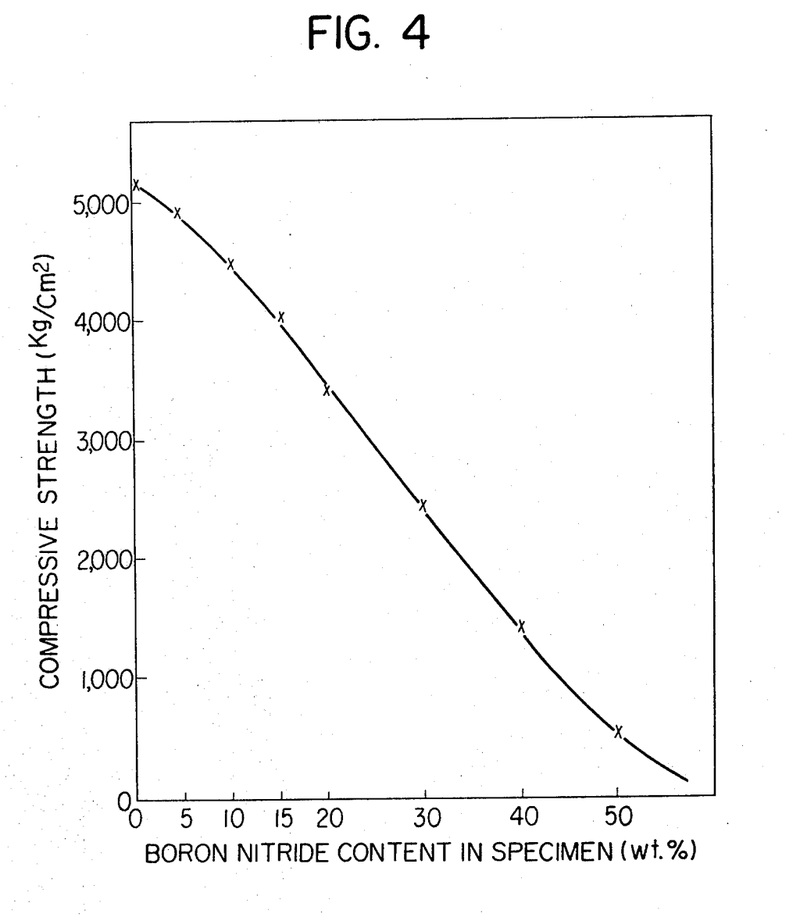
FIG. 4 is a graph illustrating compressive strength of various test specimens.

FIG. 4 is a graph illustrating values of the compressive strength of the test specimens. The compressive strength test was carried out at a loading rate of 4 kg/sec. According as the boron nitride content increases, the compressive strength of test specimens tends to decrease. For the specimen with a boron nitride content of 50 wt. %, the boron nitride as the dispersed phase cuts the network of silicon nitride along with the decrease in the above-mentioned bulk density, leading to a serious decrease in strength, so that the compressive strength decreased to below 1,000 kg/cm².

Figure 5:
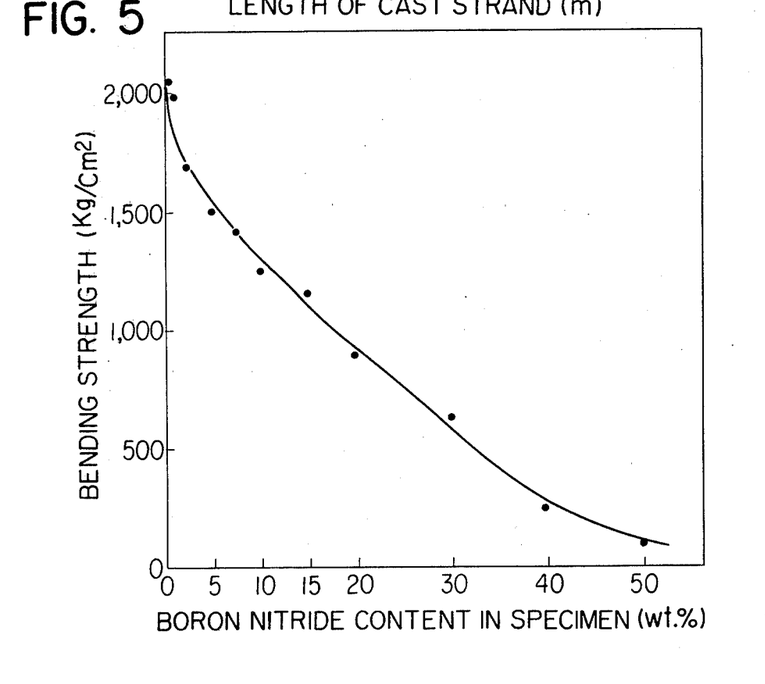
FIG. 5 is a graph illustrating bending strength of various test specimens.

FIG. 5 is a graph illustrating values of the bending strength of the test specimens. The bending strength test was carried out by the three-point loading method with a distance between fulcrums of 100 mm. According as the boron nitride content increases, the bending strength of test specimens tends to decrease: for the specimen with a boron nitride content of 50 wt. %, the bending strength decreased to below 300 kg/cm².

Figure 6:
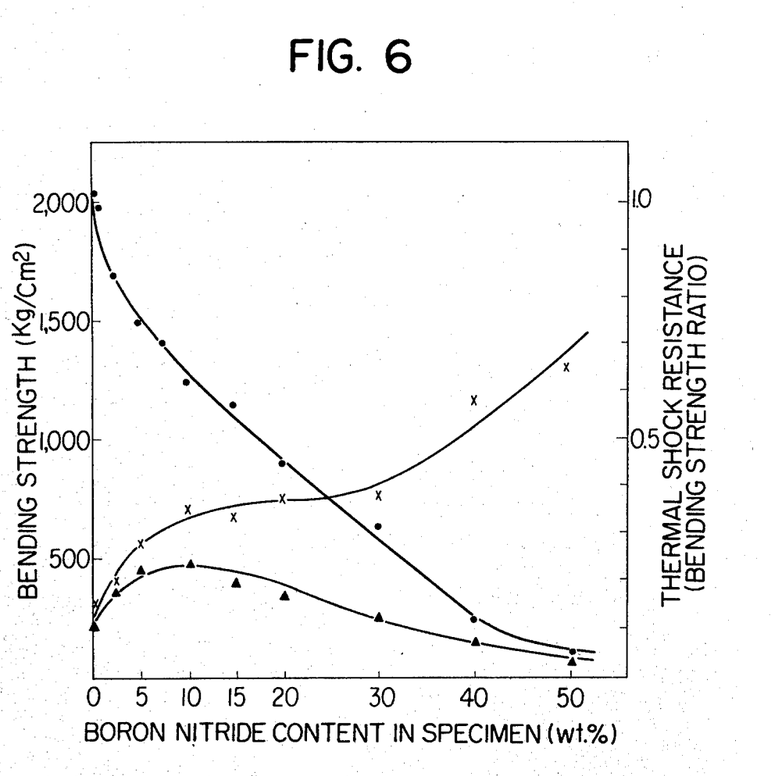
FIG. 6 is a graph illustrating thermal shock resistance of various test specimens.

FIG. 6 is a graph illustrating values of the thermal shock resistance of the test specimens. A specimen is heated in a nitrogen atmosphere to keep a constant temperature of 1,200° C. for three hours, and then subjected to a quenching temperature by placing it into water at a temperature of 25° C. The thermal shock resistance is herein represented by the ratio of the bending strength of said specimen after the above-mentioned heating and quenching treatments to the bending strength of said specimen before said treatments. In FIG. 6, marks "●" represent the bending strength before the application of the above-mentioned heating and quenching treatments, marks "Δ" represent the bending strength after the application of the heating and quenching treatments, and marks "X" represent the ratio of bending strength after to before the heating and quenching treatments, i.e., the thermal shock resistance. As is clear from FIG. 6, for the specimens having a boron nitride content of at least 3 wt. %, the thermal shock resistance could be remarkably improves.

Figure 7:
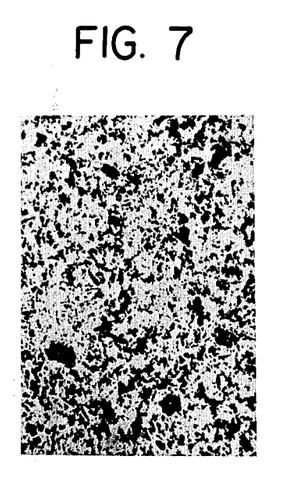
FIG. 7 is a micrograph of 250 magnifications showing the structure of a test specimen containing 90 wt.% silicon nitride and 10 wt.% boron nitride.

FIG. 7 is a 250-magnification micrograph showing the structure of No. 3 specimen (silicon nitride: 90 wt. %; boron nitride: 10 wt. %). As is evident from this micrograph, boron nitride was uniformly distributed as a dispersed phase in the network of silicon nitride in the structure of the specimens.

EXAMPLE 2

By a method similar to that of Example 1, six kinds of composite sinter of silicon nitride/boron nitride specimens with different content ratios of silicon nitride and boron nitride as shown in Table 5 below, and a kind of silicon nitride sinter specimen, for comparison purposes, not containing boron nitride, i.e., seven kinds of specimens in total were prepared. In this Example, a pressure of 1 ton/cm² was employed in preparing a green compact by applying a pressure to the raw materials by using the rubber press machine.

TABLE 5

| Specimen No. | Silicon nitride (wt. %) | Boron nitride (wt. %) |
|---|---|---|
| 1 | 100 | 0 |
| 2 | 97 | 3 |
| 3 | 95 | 5 |
| 4 | 90 | 10 |
| 5 | 80 | 20 |
| 6 | 60 | 40 |
| 7 | 50 | 50 |

Figure 8:
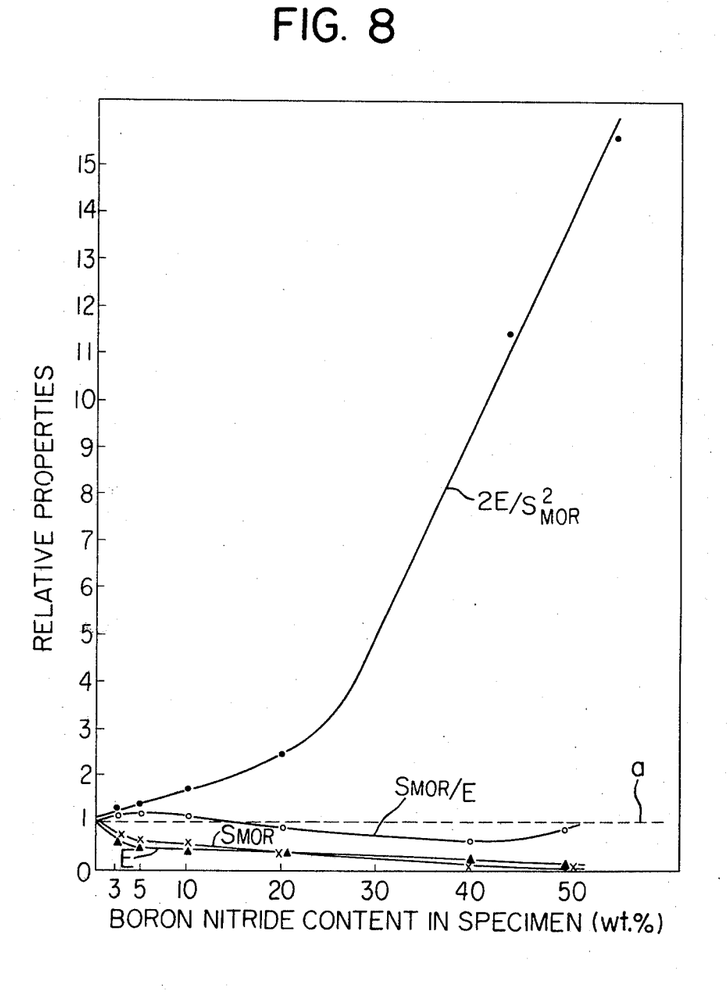
FIG. 8 is a graph illustrating cracking resistance, crack propagation resistance, bending strength and modulus of elasticity of various test specimens; and, FIG. 9 is a graph illustrating cracking resistance, crack propagation resistance and bending strength of various test specimens.

On the even kinds of specimens, their characteristic values in cracking resistance ($S_{MOR}/E$), crack propagation resistance ($2E/S^2_{MOR}$), bending strength ($S_{MOR}$), and modulus of elasticity (E) were investigated. FIG. 8 is a graph illustrating the results of the investigation. In FIG. 8, marks "o" represent the cracking resistance ($S_{MOR}/E$), marks "●" represent the crack propagation resistance ($2E/S^2_{MOR}$), marks "x" represent the bending strength ($S_{MOR}$), and marks "Δ" represent the modulus of elasticity (E), these properties being expressed by the relative characteristic values, with the value for the specimen (No. 1) not containing boron nitride as 1 (broken line "a" in FIG. 8).

As shown in FIG. 8, in the composite sinter specimens of silicon nitride/boron nitride, as compared with the reference silicon nitride sinter specimen, although there is no remarkable change in the relative characteristic values of the cracking resistance ($S_{MOR}/E$), the relative characteristic value of the crack propagation resistance ($2E/S^2_{MOR}$) remarkably increased along with the increase of the boron nitride content. With a boron nitride content of over 40 wt. %, on the other hand, both the bending strength ($S_{MOR}$) and the modulus of elasticity (E) decreased.

EXAMPLE 3

By a method similar to that of Example 1, four kinds of composite sinter specimens of silicon nitride/boron nitride with different content ratios of silicon nitride and boron nitride as shown in Table 6 below, and a kind of silion nitride sinter specimen, for comparison purposes, not containing boron nitride, i.e., five kinds of specimens in total were prepared. In this Example, the sinter was held at 1,450° C. during the nitrification treatment for 36 hours.

TABLE 6

| Specimen No. | Silicon nitride (wt. %) | Boron nitride (wt. %) |
|---|---|---|
| 1 | 100 | 0 |
| 2 | 92.5 | 7.5 |
| 3 | 90 | 10 |
| 4 | 87.5 | 12.5 |
| 5 | 85 | 15 |

Figure 9:
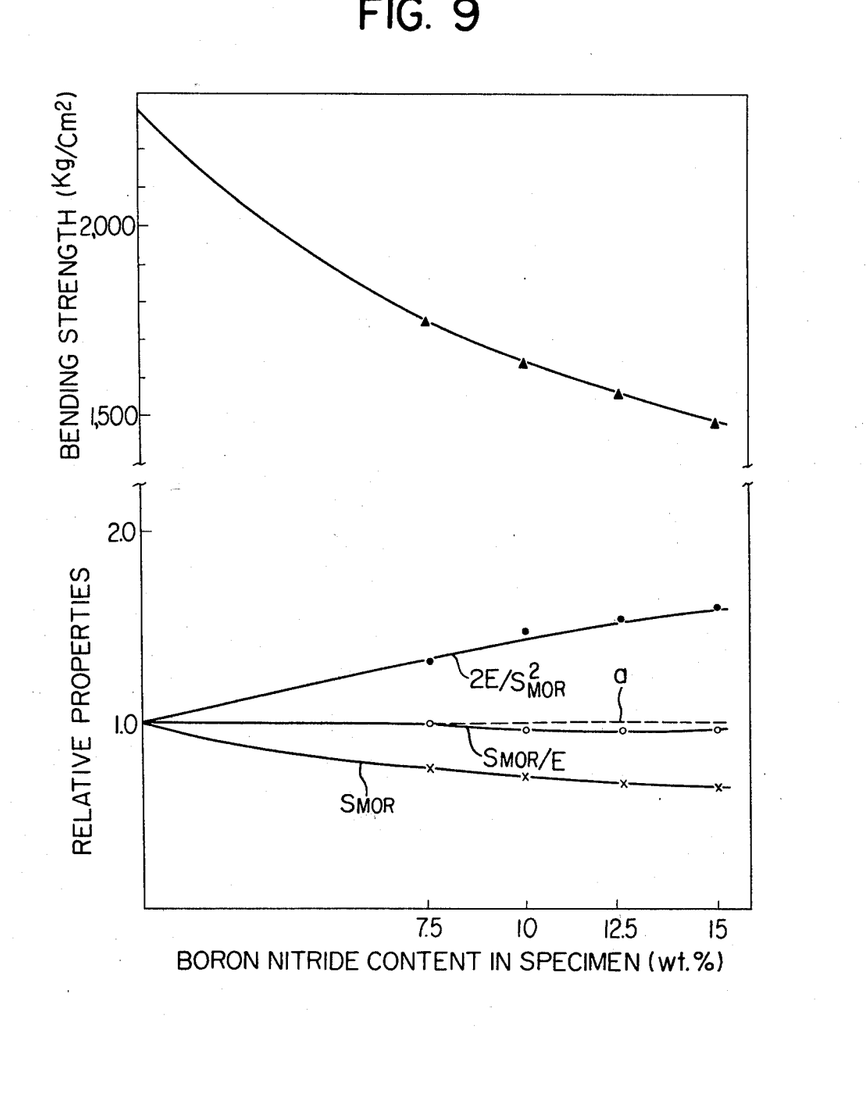

On the five kinds of specimens, the cracking resistance ($S_{MOR}/E$), the crack propagation resistance ($2E/S_{MOR}^2$), the relative characteristic values of the bending strength ($S_{MOR}$), and the actual values of the bending strength were investigated. FIG. 9 is a graph illustrating the results of this investigation. In FIG. 9, marks "o" represent the cracking resistance ($S_{MOR}/E$), marks "●" represent the crack propagation resistance ($2E/S^2_{MOR}$), marks "x" represent the relative characteristic values of the bending strength ($S_{MOR}$) and marks "Δ" represent the actual values of the bending strength ($S_{MOR}$).

As shown in FIG. 9, the composite sinter specimens of silicon nitride/boron nitride were larger in relative characteristic value of the crack propagation resistance ($2E/S_{MOR}^2$) than the silicon nitride sinter specimen also in this Example. In addition, in this Example, elongation of the holding time of sinter at 1,450° C. during nitrification improved the bending strength over that of Example 1.

EXAMPLE 4

As the boron nitride powder (purity: 99%), seven kinds of powder with different maximum particle sizes of 500 μm, 200 μm, 100 μm 50 μm, 20 μm, 10 μm and 5 μm were singly employed. Except for this, by a method similar to that of the Example 1, seven kinds of composite sinter specimens of silicon nitride/boron nitride consisting of 90 wt. % silicon nitride and 10 wt. % boron nitride, with different particle sizes of boron nitride were prepared.

On the above-mentioned seven kinds of specimens, the cracking resistance ($S_{MOR}/E$) and the thermal shock value (ΔT(°C.)) were investigated. A specimen is heated to a temperature of 1,450° C., and the specimen held at this temperature is quenched in water at a temperature of 25° C. The critical temperature up to which no deterioration of the bending strength is observed in said specimen is measured, and the thermal shock value is represented by this critical temperature.

Table 7 shows the results of such measurement, in comparison with those of the silicon nitride sinter specimen not containing boron nitride. As is evident from Table 7, in cases with a particle size of boron nitride of up to 50 μm, the specimen shows a high thermal shock value, i.e., an improvement in cracking resistance.

TABLE 7

| | Silicon nitride sinter specimen | Composite sinter specimen of silicon nitride/boron nitride | | | | | |
|---|---|---|---|---|---|---|---|
| Particle size of boron nitride (μm) | — | 500 | 200 | 100 | 50 | 20 | 10 | 5 |
| Thermal shock value ΔT (°C.) | 350 | 400 | 400 | 450 | 550 | 580 | 600 | 600 |

EXAMPLE 5

Break rings for horizontal continuous casting test of large-sized cast strands under the casting conditions given in Table 1 were prepared by a method similar to that of Example 1 from a composite sinter of silicon nitride/boron nitride consisting of 90 wt. % silicon nitride and 10 wt. % boron nitride. A horizontal continuous casting test was carried out under the casting conditions given in Table 1, with the use of break rings made of this composite sinter of silicon nitride/boron nitride. The test was conducted in 21 test runs.

Table 8 gives the number of casting runs for each cast strand length.

TABLE 8

| Cast strand length (m) | Number of casting runs |
|---|---|
| From 200 to 210 | 6 |
| From 211 to 220 | 1 |
| From 221 to 230 | 1 |
| From 231 to 240 | 1 |
| From 241 to 250 | 1 |
| From 300 to 310 | 3 |
| From 311 to 320 | 2 |
| From 321 to 330 | 1 |
| From 331 to 340 | 1 |
| From 341 to 350 | 1 |
| From 351 to 360 | 1 |
| From 390 to 400 | 2 |

As is clear from Table 8, it was possible to continuously cast the cast strands up to a length of 400 m. In this table, in those of under 400 m in cast strand length, casting was discontinued intentionally to investigate the extent of wear and damage of the break ring, and not due to the occurrence of a damage to the break ring.

After the completion of the casting test, the breaking ring was disassembled and subjected to inspection of wear and damage. No spalling nor damage was found in the break ring, this showing a remarkable improvement in thermal shock resistance. Thus, by conducting horizontal continuous casting with the use of a break ring made of the composite sinter of silicon nitride/boron nitride of the present invention, it becomes possible to cast the cast strands smoothly without causing a breakout over a length of over 400 m.

The composite sinter of silicon nitride/boron nitride is applicable not only to the above-mentioned break ring, but also widely to various members required to have a high thermal shock resistance even under severe service conditions and excellent wear resistance and erosion resistance and to be capable of being subjected to high precision shaping, for example, in a rotary nozzle, the material for forming a molten metal pouring hole, sliding parts and sealing zones of a rotary nozzle, and can display remarkable effects.

The composite sinter of silicon nitride/boron nitride of the present invention is, as described above in detail, excellent in thermal shock resistance, wear resistance and erosion resistance and allows easy machining. It is therefore possible to manufacture therefrom a member required to have a high dimensional shape precision. The subject composite sinter is therefore an optimum material for a break ring for horizontal continuous casting, for example, and can be easily manufactured at low costs, thus providing industrially useful effects.

What is claimed is:

1. A method for manufacturing a composite sinter of silicon nitride/boron nitride which consists essentially of a network of silicon nitride within the range of from 60 to 97 wt. % and boron nitride within the range of from 3 to 40 wt. % as a dispersed phase in said network of said silicon nitride which comprises:

kneading silicon powder within the range of from 47.3 to 95.1 wt. % and boron nitride powder within the range of from 4.9 to 52.7 wt. %, as raw materials, with an organic solvent solution containing a dispersant and a binder;

press-forming the resultant kneaded mixture to prepare a green compact;

sintering said green compact in a non-oxidizing atmosphere at a temperature within the range of from 1,100° to 1,300° C. to prepare a sinter having a strength permitting machining;

machining said sinter; and, sintering said machined sinter in a nitrogen atmosphere at a temperature within the range of from 1,250° to 1,450° C. to nitrify the same, thereby improving the strength and thermal shock resistance of said sinter.

2. The method of claim 1, wherein:

said silicon powder and said boron nitride powder are of a purity of at least 97%.

3. The method of claim 1 or 2, wherein:

a silicon nitride powder is added, as an additional raw material, to said raw materials, at a ratio of up to 40 wt. % relative to the total quantity of said silicon nitride powder and said silicon powder.

4. The method of claim 2 or 3, wherein:

at least one oxide selected from the group consisting of magnesia (MgO), yttria ($Y_2O_3$), aluminum ($Al_2O_3$) and lanthanium oxide ($La_2O_3$) is added, as a sintering assistant, to said raw materials, at a ratio of up to 10 wt. % relative to the total quantity of said sintering assistant and said raw materials.

5. The method of claim 4, wherein:

at least one oxide selected from the group consisting of magnesia (MgO), yttria ($Y_2O_3$), alumina ($Al_2O_3$) and lanthanium oxide ($La_2O_3$) is added, as a sintering assistant, to said raw materials and said additional raw material, at a ratio of up to 10 wt. % relative to the total quantity of said sintering assistant, said raw materials and said additional raw material.

6. A composite sinter manufacture of silicon nitride/boron nitride, which consists essentially of a network of silicon nitride within the range of from 60 to 90 wt. % and boron nitride within the range of from 3 to 40 wt. % as a dispersed phase in said network of said silicon nitride;

said composite sinter manufacture being manufactured by the reaction sintering method comprising mixing silicon powder within the range of from 47.3 to 95.1 wt. % and boron nitride powder within the range of from 4.9 to 52.7 wt. % as raw materials with an organic solvent solution containing a dispersant and a binder; press-forming the mixture to form a green compact; sintering said green compact in a non-oxidizing atmosphere; and then sintering and nitrifying in a nitrogen atmosphere at a temperature within the range of from 1,250° to 1,450° C. to nitrify the silicon and form said composite sinter manufacture having improved strength and thermal shock resistance.

7. The composite sinter manufacture of claim 6, wherein:

said silicon powder and said boron nitride powder are of a purity of at least 97%.

8. The composite sinter manufacture of claim 6 or 7, wherein:

silicon nitride powder is added, as an additional raw material, to said raw materials, at a ratio of up to 40 wt. % relative to the total quantity of said silicon nitride powder and said silicon powder.

9. The composite sinter manufacture of claim 6 or 7, wherein:

at least one oxide selected from the group consisting of magnesia (MgO), yttria ($Y_2O_3$), alumina ($Al_2O_3$) and lanthanium oxide ($La_2O_3$) is added, as a sintering assistant, to said raw materials, at a ratio of up to 10 wt. % relative to the total quantity of said sintering assistant and said raw materials.

10. The composite sinter manufacture of claim 8, wherein:

at least one oxide selected from the group consisting of magnesia (MgO), yttria ($Y_2O_3$), alumina ($Al_2O_3$) and lanthanium oxide ($La_2O_3$) is added, as a sintering assistant, to said raw materials and said additional raw material, at a ratio of up to 10 wt. % relative to the total quantity of said sintering assistant, said raw materials and said additional raw material.

* * * * *

UNITED STATES PATENT AND TRADEMARK OFFICE
CERTIFICATE OF CORRECTION

PATENT NO. : 4,412,008

DATED : October 25, 1983

INVENTOR(S) : Akira MIYAMOTO et al

It is certified that error appears in the above-identified patent and that said Letters Patent is hereby corrected as shown below:

Title page, left column, under the heading "Assignees": replace "Shiroenga" with --Shirorenga--.

Column 3, line 5: replace "1871" with --1971--.

Column 3, Table 2, the left column, material No. 2, replace "$\beta-Si_3N_{1,896}$"-- with --$\beta-Si_3N_4$--.

Column 16, line 53 (Claim 4): replace "2 or 3" with --1 or 2--.

Column 16, line 55 (Claim 4): replace "aluminum" with --alumina--.

Column 16, line 60 (Claim 5): replace "4" with --3--.

Column 18, line 18 (Claim 10): replace "(MgO," with --(MgO),--.

Signed and Sealed this

Twenty-sixth Day of March 1985

[SEAL]

Attest:

DONALD J. QUIGG

Attesting Officer     Acting Commissioner of Patents and Trademarks